UNITED STATES PATENT OFFICE.

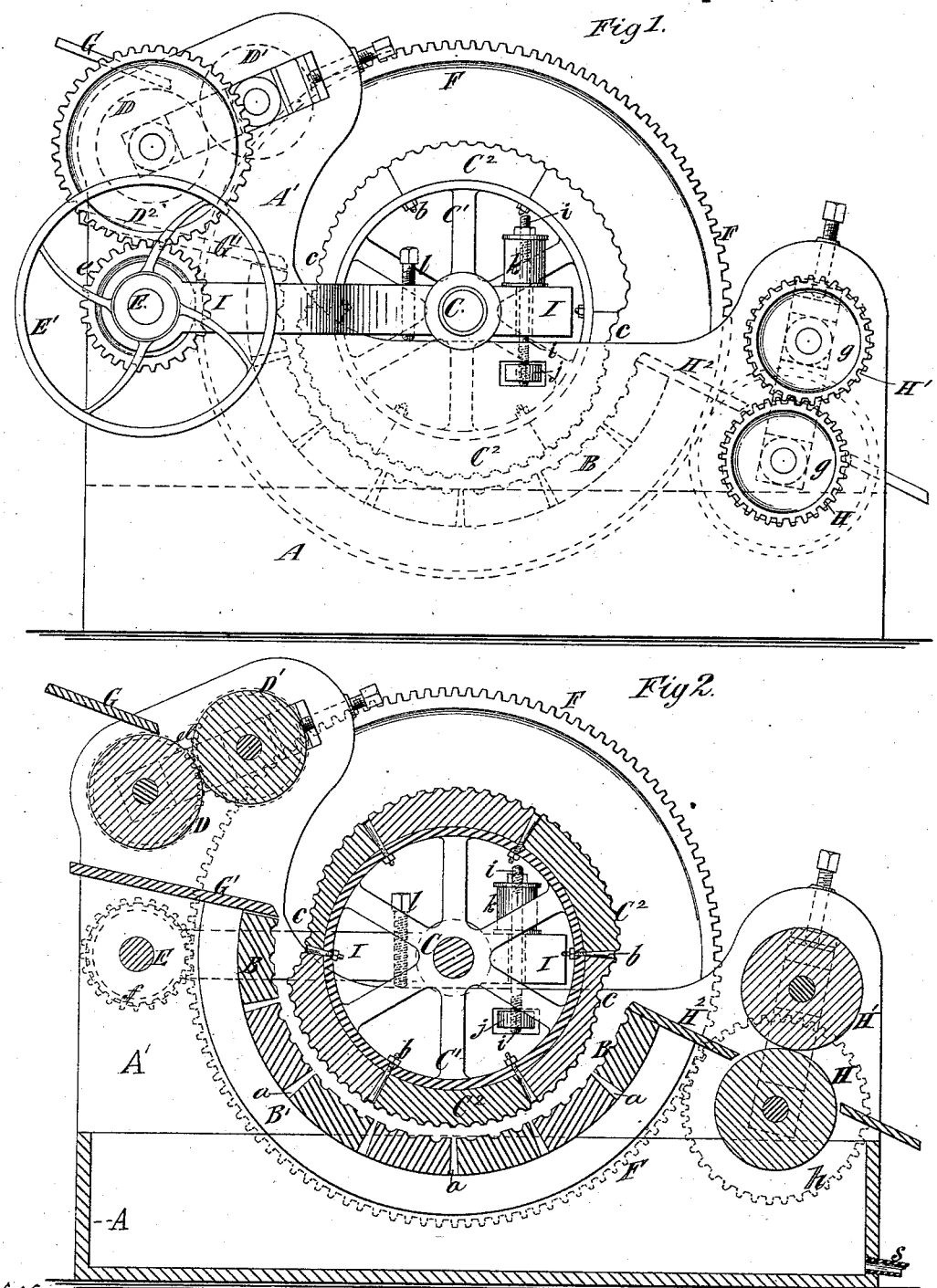

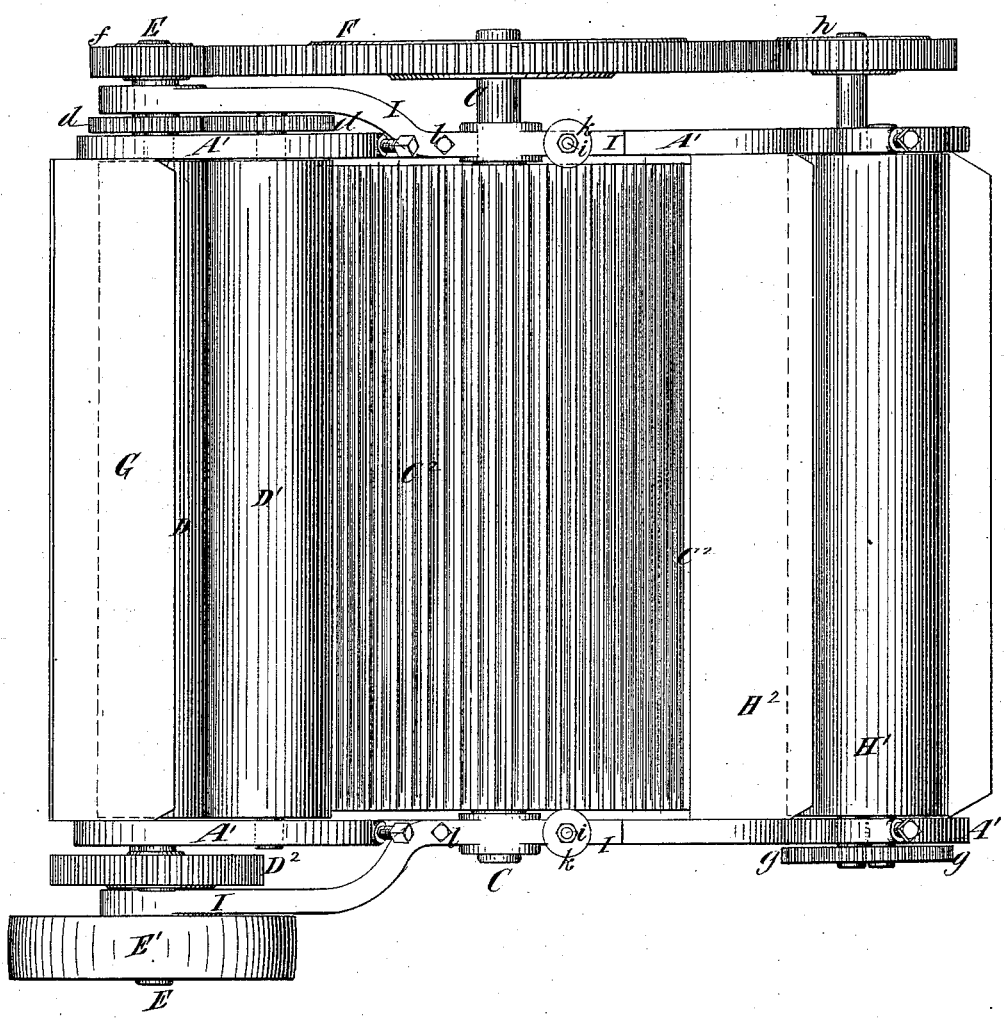

GELSTON SANFORD, OF BROOKLYN, NEW YORK, ASSIGNOR, BY MESNE ASSIGNMENTS, TO THE INTERNATIONAL FIBRE AND JUICE EXTRACTING COMPANY, OF NEW YORK.

MACHINE FOR REDUCING SUBSTANCES AND EXTRACTING JUICES.

SPECIFICATION forming part of Letters Patent No. 285,166, dated September 18, 1883.

Application filed February 15, 1883. (No model.)

*To all whom it may concern:*

Be it known that I, GELSTON SANFORD, of Brooklyn, in the county of Kings and State of New York, have invented a new and useful Improvement in Machines for Reducing Substances and Extracting Juices, of which the following is a specification.

My invention relates to a mill or machine for use in extracting the juice from sugar-cane or sorghum, in extracting the oil from seed, in making cider or wine, and in crushing and rubbing and reducing other materials or substances.

The invention consists in details of construction and combinations of parts hereinafter described, and pointed out in the claims.

In the accompanying drawings, Figure 1 is an end elevation of a machine embodying my invention. Fig. 2 is a vertical section thereof, and Fig. 3 is a plan thereof.

Similar letters of reference designate corresponding parts in all the figures.

A designates a tank or vat, on which the side frames, A', of the machine are supported.

Over the tank is a concave or arc-shaped bed, B, which may be constructed of metal, stone, hard wood, or any other suitable material and in any suitable way. As here shown, the concave or bed B is composed of longitudinal bars or sections, which are supported at the ends by arc-shaped bearers B', secured on the inner sides of the frame A'. The bars or sections are secured by bolts at their ends to said bearers, and are arranged at a little distance apart to form spaces $a$ for the delivery of liquid into the tank; but the bed or concave may be perforated by numerous holes, or otherwise constructed so as to obtain the same result.

Above and approximately concentric with the arc-shaped bed or concave B is mounted a shaft, C, which supports a rotary cylinder. This cylinder may be made in various ways and of various materials. I may, for example, as here shown, secure upon the shaft two or more heads, C', and secure to them longitudinal bars or sections $C^2$, of metal, stone, hard wood, or any other suitable material. The bars or sections $C^2$ may be secured to the heads C' in any suitable way. I have here shown the heads C' as provided with cylindric flanges or rims, and the bars or sections $C^2$ are secured thereto by bolts $b$, having taper bodies, which wedge in between said bars or sections. The surfaces of the concave or bed and cylinder are preferably roughened in any suitable way—as, for example, by fluting or grooving them; but they may be ribbed, lagged, toothed, or otherwise roughened. In the surface of the cylinder are formed one or more depressions or recessed portions, $c$, which form cam-surfaces below or inside the periphery of the intermediate portions of the cylinder.

I have here shown the cylinder as having two oppositely-arranged depressions or recessed portions; but more than two may be provided, and the portions intervening between these depressions may or may not be arcs concentric with the surface of the concave or bed. As the depressions or recessed portions are brought by the rotation of the cylinder opposite the edge of the concave or bed, they form cavities, pockets, or hoppers, which readily take the material or substance to be operated upon and carry it forward between the cylinder and the bed or concave. The material or substance is acted upon by the cam-surfaces formed by the depressions or recessed portions, and by the portions intervening between such depressions or recessed portions, and the material or substance is thoroughly macerated or reduced and its juices are freed from the fibrous or other solid matter.

Upon one side, and somewhat above the center of the shaft C, are arranged a pair of rolls, D D', which are geared together by wheels $d$ $d$, and the bearings of which are suitably arranged in the side frames, A'. The roll D has upon its shaft a wheel, $D^2$, and motion is imparted to the rolls by means of a pinion, $e$, engaging with the wheel $D^2$, and fixed on a driving-shaft, E. Motion may be imparted to the shaft E by a belt passing onto a pulley, E', or by any other suitable mechanism, and the main cylinder-shaft C is rotated by means of a pinion, $f$, on said driving-shaft engaging with a large gear-wheel, F, on the shaft C.

G designates a feed-board over the rolls

D D', and from which the material or substance to be operated on is fed between the said rolls. By these rolls it is crushed and delivered to the bed or concave B, or to a board or inclined chute, G', over which it passes thereto.

On the opposite side of and somewhat below the shaft C are arranged a pair of rolls, H H', geared together by wheels $g$ $g$, and receiving motion from the large gear-wheel F through a pinion, $h$, fixed on the shaft of the roll H. The rolls H H' are mounted in bearings in the frames A', and from the concave or bed B the materials or substances pass over the delivery-board $H^2$ and between the said rolls, and the juice is expressed from the fibrous or other solid matter.

From the tank A the juice may be delivered by a pipe, S. The shaft C of the cylinder might be mounted in fixed bearings; but I have here shown it as mounted in levers or arms I, which are loosely fitted to the driving-shaft E, as shown in Figs. 1 and 3.

At the opposite ends of the levers I they are connected by rods or bolts $i$ with the frames A', the bolts being provided with nuts $j$, and above the levers there are spring boxes or cases $k$, through which the bolts or rods pass. The cylinder, being thus supported, acts upon the materials passing under it with a yielding pressure, and this pressure may be increased or diminished by adjusting the nuts $j$. The downward movement of the cylinder and the levers or arms I may be limited by adjustable stops, consisting of set-screws $l$, inserted in the levers and bearing on the frames A'. The bearings of the shaft C may be otherwise formed, so that the cylinder will act with a yielding pressure.

Although in this specification the machine has been more particularly described with reference to its use for the grinding and reduction of substances from which juices or liquid matters are expressed, it is also applicable for the crushing, reduction, and disintegration of dry substances, and to the breaking up and separation of the heterogeneous components of any natural substances.

I am aware that rollers or cylinders for crushing or grinding have been journaled in arms capable of swinging on their fulcrums as the cylinder rises and falls, and I do not therefore claim such construction, broadly, as of my invention.

What I claim as my invention, and desire to secure by Letters Patent, is—

1. The combination, with a concave or arc-shaped bed having a grooved, fluted, or roughened surface, of a rotary cylinder having depressions or recessed portions in its periphery, and having the intervening portions greater in extent than the depressions or recesses, and formed with fluted or roughened faces, which are concentric with the face of the concave or bed, substantially as herein described.

2. The combination, with the concave or bed and the cylinder having in its surface depressions or recessed portions, of a pair of crushing-rolls, between which materials are fed to the cylinder and concave or bed, substantially as and for the purpose described.

3. The combination, with a rotary cylinder provided with depressions or recesses $c$ in its periphery, of the concave or bed B, extending entirely across under the cylinder, and a pair of pressing-rolls arranged at the side of the cylinder and considerably above the lower portion of the concave or bed, substantially as herein described.

4. The combination, with a rotary cylinder provided with depressions or recesses $c$ in its periphery, of a concave or bed, B, extending entirely across under the cylinder, a pair of crushing-rolls arranged on one side of said cylinder and concave or bed, and a pair of pressing-rolls arranged on the other side of the cylinder and considerably above the lower portion of said concave or bed, substantially as herein described.

5. The combination of the concave or bed B, the rotary cylinder, the pair of crushing-rolls D D', the feed-board G, the pair of pressing-rolls H H', and the delivery-board $H^2$, substantially as described.

6. The combination of the stationary concave or bed B, the cylinder and its shaft C, the large gear F, the driving-shaft E and pinion $f$, the levers or arms I, fulcrumed on the shaft E and carrying the bearings of the shaft C, the adjustable stops $l$, for limiting the movement of the cylinder toward the concave or bed, the springs for holding said levers down with a yielding pressure, and means for adjusting the tension of said springs, all substantially as described.

GELSTON SANFORD.

Witnesses:
FREDK. HAYNES,
CHANDLER HALL.